United States Patent
Whalen et al.

(10) Patent No.: US 8,079,311 B2
(45) Date of Patent: Dec. 20, 2011

(54) TELEVISION SUPPORT AND MOUNTING KIT

(75) Inventors: Kenneth Whalen, San Diego, CA (US); Paul R. Jones, San Marcos, CA (US)

(73) Assignee: Whalen Furniture Manufacturing, Inc., San Diego, CA (US)

( * ) Notice: Subject to any disclaimer, the term of this patent is extended or adjusted under 35 U.S.C. 154(b) by 768 days.

(21) Appl. No.: 11/860,271

(22) Filed: Sep. 24, 2007

(65) Prior Publication Data

US 2009/0039212 A1    Feb. 12, 2009

Related U.S. Application Data

(63) Continuation-in-part of application No. 11/890,828, filed on Aug. 8, 2007, now abandoned.

(51) Int. Cl.
*A47B 23/00*    (2006.01)

(52) U.S. Cl. ............... 108/42; 108/50.01; 108/50.11; 248/923; 248/125.8; D6/479; D6/474

(58) Field of Classification Search ........... 108/42, 108/50.01, 50.02, 10, 23, 50.11, 91, 92, 96; 248/125.8, 150, 176.1, 917, 149, 154, 157, 248/161, 178.1, 176.3, 132, 920, 333, 327, 248/220.21, 274.1, 200; 312/223.6, 223.1, 312/223.3; D6/479, 474, 477

See application file for complete search history.

(56) References Cited

U.S. PATENT DOCUMENTS

| | | |
|---|---|---|
| 366,525 A | 7/1887 | Taliaferro |
| 368,388 A | 8/1887 | Drake |
| 866,522 A | 9/1907 | Scanlon |
| 1,324,537 A * | 12/1919 | Belcher .................. 108/108 |
| 1,398,601 A | 11/1921 | Osterhout |
| 1,590,725 A | 6/1926 | Corsgren |
| 1,598,569 A | 6/1926 | Champe |
| 1,692,337 A | 11/1928 | Forbes |
| 1,797,847 A | 3/1931 | John |
| 2,193,647 A | 3/1940 | Rush |
| 2,359,895 A | 10/1944 | Burton |
| D141,593 S | 6/1945 | Doty |
| 2,535,112 A | 12/1950 | Woody |
| 2,605,155 A | 7/1952 | Lewis |
| 3,232,249 A | 2/1966 | Perez |
| 3,358,957 A | 12/1967 | Lindenmuth |
| 3,875,356 A | 4/1975 | Heim et al. |
| 3,905,573 A | 9/1975 | Davis |
| 4,020,510 A | 5/1977 | Fabian |

(Continued)

OTHER PUBLICATIONS

Edmonds, Tom, "Special Report: New TV Formats", *Furniture Today*, pp. 12-13, Apr. 28, 2003.

(Continued)

*Primary Examiner* — Jose V Chen
(74) *Attorney, Agent, or Firm* — Barlow, Josephs & Holmes, Ltd.

(57) ABSTRACT

A universal TV support and mounting kit that accommodates the principal varieties of TVs that have to be mounted or supported, namely CRT type and two panel types (plasma and LCD), in a single kit. The kit that allows the consumer to employ any of the three modes of support, namely stand mount, console mount and wall mount. The console mount incorporates a vertical spine and a gooseneck mount. A frame is provided that can be attached to the gooseneck mount or to a wall. Pivoting and tilting is accommodated by the gooseneck mount.

17 Claims, 11 Drawing Sheets

U.S. PATENT DOCUMENTS

| | | | |
|---|---|---|---|
| 4,076,203 A * | 2/1978 | McDonnell | 248/247 |
| 4,272,136 A | 6/1981 | Sengua | |
| 4,410,158 A | 10/1983 | Maffei | |
| 4,444,323 A * | 4/1984 | Travis | 211/193 |
| 5,207,405 A | 5/1993 | Cobb | |
| 5,282,427 A | 2/1994 | Steinhilber | |
| 5,549,264 A | 8/1996 | West | |
| 6,158,701 A | 12/2000 | Deshler | |
| 6,288,891 B1 | 9/2001 | Hasegawa et al. | |
| 6,327,982 B1 | 12/2001 | Jackson | |
| 6,347,433 B1 | 2/2002 | Novin et al. | |
| 6,425,631 B1 | 7/2002 | Lin | |
| 6,609,691 B2 | 8/2003 | Oddsen, Jr. | |
| 6,695,270 B1 | 2/2004 | Smed | |
| 6,699,146 B1 | 3/2004 | Winter et al. | |
| 6,704,193 B2 | 3/2004 | Vathulya | |
| 6,758,454 B2 | 7/2004 | Smed | |
| D495,163 S | 8/2004 | Weatherly | |
| 6,796,536 B1 | 9/2004 | Sevier | |
| 6,923,413 B2 * | 8/2005 | Dozier | 248/294.1 |
| D517,349 S * | 3/2006 | Lara | D6/477 |
| 7,082,882 B2 | 8/2006 | Heimbrock | |
| 7,118,080 B2 | 10/2006 | Chan et al. | |
| 7,175,146 B2 * | 2/2007 | Kim | 248/923 |
| 7,178,775 B2 * | 2/2007 | Pfister et al. | 248/920 |
| D537,658 S * | 3/2007 | Tung | D6/479 |
| D539,125 S * | 3/2007 | Ly Hau et al. | D8/373 |
| D539,565 S * | 4/2007 | Sexton, III | D6/477 |
| D541,138 S | 4/2007 | Whalen et al. | |
| 7,261,261 B2 | 8/2007 | Ligertwood | |
| D566,426 S * | 4/2008 | Stenhouse et al. | D6/474 |
| D567,546 S * | 4/2008 | Liu | D6/479 |
| D574,698 S * | 8/2008 | Grey et al. | D8/373 |
| 7,530,538 B2 * | 5/2009 | Whalen et al. | 108/50.01 |
| D595,978 S * | 7/2009 | Portnoy et al. | D6/477 |
| 2002/0011544 A1 | 1/2002 | Bosson | |
| 2004/0011932 A1 | 1/2004 | Duff | |
| 2004/0041062 A1 | 3/2004 | Ozolins et al. | |
| 2004/0079849 A1 | 4/2004 | Rudolf | |
| 2004/0079858 A1 | 4/2004 | Rudolf | |
| 2004/0084578 A1 | 5/2004 | Cho et al. | |
| 2004/0084579 A1 | 5/2004 | Lee et al. | |
| 2004/0113031 A1 | 6/2004 | Sung | |
| 2004/0118984 A1 | 6/2004 | Kim et al. | |
| 2004/0188573 A1 | 9/2004 | Weatherly | |
| 2004/0188574 A1 | 9/2004 | Weatherly et al. | |
| 2004/0211870 A1 | 10/2004 | Bremmon et al. | |
| 2004/0256524 A1 | 12/2004 | Beck et al. | |
| 2005/0041379 A1 | 2/2005 | Jang | |
| 2005/0045782 A1 | 3/2005 | Lee et al. | |
| 2005/0167549 A1 | 8/2005 | Ligertwood | |
| 2008/0156949 A1 * | 7/2008 | Sculler et al. | 248/220.21 |

OTHER PUBLICATIONS

Omni Mount Home Entertainment U3 Tilt Installation Instructions, pp. 1-6, Mar. 10, 2004.

* cited by examiner

TELEVISION SUPPORT AND MOUNTING KIT

CROSS-REFERENCE TO RELATED APPLICATIONS

The instant application is a Continuation In Part of U.S. utility application Ser. No. 11/890,828 filed Aug. 8, 2007 now abandoned entitled "TELEVISION SUPPORT AND MOUNTING KIT."

FIELD OF THE INVENTION

The invention is in the field of mounting systems for televisions to be wall-mounted or carried on a base (console).

BACKGROUND OF THE INVENTION

The introduction of so-called flat panel televisions has added additional complexity to the task of the purchaser to support the television on a suitable stand or to mount it from a wall or above a console. As used herein televisions (TVs) should be understood to include monitors without tuners and televisions with built in tuners. Although referred to as flat panel TV's, many of these devices have substantial depth and may weight up to 165 lbs or more. Flat panel TV's (referred to herein as panel TV's) represent a substantial investment for the purchaser and therefore mounting them without damaging them during the installation or thereafter, is a major concern.

Panel TV manufacturers normally make a bracket system to mount the panel TV on a wall. However, purchasers may prefer to use a stand, or to position the panel TV on a console. For that reason mounting systems are frequently sold separately. This forces the panel TV retailer to carry a large inventory of incompatible mounting systems, or to leave the consumer to purchase the mounting system directly from the manufacturer. A purchase direct from the manufacturer forces the consumer to wait for an extended period while the mounting system is shipped and leads to dissatisfaction with the retailer for not stocking the mounting system for the panel TV purchased Prior art mounting systems require a high degree of skill in mounting the system to the wall or other support and then securing the TV on the mount. The resulting installation is likely (as a consequence of stud position) to be offset from the ideal position. Additionally the manufacture's system normally provides only one mode of mounting, such as wall mount or stand mount.

It is therefore desirable to have a universal TV support and mounting kit that accommodates the principal varieties of TVs that have to be mounted, namely CRT type, and two panel types (plasma and LCD), in a single kit. It is especially to be desired to have a kit that allows the consumer to employ any of the three modes of support, namely stand mount, console mount and wall mount.

SUMMARY OF THE INVENTION

A kit according to the exemplary embodiment of the invention resolves the deficiencies of prior art solutions in a kit that provides all forms of mounting panel TV's in a single kit. The components are designed to be economical of manufacture and ease of assembly with common tools. By the assembly of the provided components, the user can elect to support a wide range of TV's on a console, suspended above a support, or mounted to a wall. Kit components are designed to be used in as many of the different configurations as possible.

The kit incorporates components for a console with multiple shelves carried on shelf supports. A short spine is provided for use when the console is to be used to support a TV on a stand on the upper shelf. The short spine has mounting openings that engage the shelf supports and extends between the floor or lowest shelf support to the level of the upper most shelf support. A console with three shelves, and therefore three shelf supports, is described as exemplary. The short spine connects to the shelf supports to increase the weight carrying capacity of the shelves and transfer the weight to the floor. Using the short spine allows the user to assemble a console with an upper surface that can carry a conventional (CRT) TV or a panel TV with a stand. The spine is preferably of a rectangular hollow cross-section. The use of a rectangular configuration allows more of the spine to be in contact with the shelf supports than would a circular cross-section, for example. The spine has a plurality of openings in it's rear surface. Because the spine is hollow, these openings permit wires and cabling to be run internally between, for example, electronic equipment on the shelves and the panel TV, thus preventing entanglement of the wires and cables and improving the finished appearance of the installation.

The kit also includes a long spine, horizontal offset support arm (offset arm) with a panel TV mounting structure on the arm. In one configuration the long spine is used instead of the short spine. Since it attaches to the shelf supports, it provides for the transfer of loads carried on the shelves, but in addition extends above the console to provide an elevated support for a panel TV. The offset arm extends horizontally forward (as mounted) to suspend the panel TV over the console base and give the panel a floating appearance. The offset support incorporates a offset arm that carries a mounting structure. In one embodiment the mounting structure has a spaced structural support with a hole pattern that provides mounting openings for mating the structure to the rear of a panel TV. In the exemplary embodiment the mounting structure is in the form of a mounting plate but could be formed, for example, of spaced radial arms. Many panel TV's, especially LCD panel TV's contain hard points with threaded holes with standard spacing (the Vesa standard). The mounting structure has openings matching the Vesa standard so that the structure is easily bolted to the TV to carry the TV above the console.

Spacing the mounting structure and therefore the TV forward of the spine, allows for the incorporation of pivoting and titling mechanisms in the offset arm. The offset arm incorporates mating tilting brackets that are hinged together at their upper ends and free for limited pivoting rotation at the lower ends. This allows the installed TV to be aimed down to face the level at which the TV will be viewed (such as at the level of facing chairs or other furniture). The tilting mechanism is locked in the selected position with fasteners at the lower end of the tilting brackets. The offset arm has a pivot mount at its outer end that cooperates with a pivot mount on the mounting structure to constrain a pivot pin. The pivot mounts collectively provide for pivoting the panel TV about a substantially vertical axis so that the TV can be turned to face the viewing area or to avoid glare.

Another embodiment of the mounting structure and another component of the kit is a XYZ frame. The term XYZ frame refers to a frame that is adjustable in 3 dimensions, and is commonly used in the industry to refer to a frame that can accommodate a wide range of non-standard hole patterns and which spaces the panel TV from the mount. The frame is designed so that it can be used in conjunction with the offset arm, or for directly mounting a panel TV to a wall. The XYZ frame is useful for larger panel TV's and those which don't use a standard mounting hole pattern. These TV's may also be heavier and therefore, without special provisions, lifting and attaching the TV to a mounting device would difficult or impossible for the average consumer.

The frame incorporates two spaced channels, with U-shaped cross-section, that are oriented to be horizontal when mounted. The channels lie in a plane. The channels are formed with a center web and two sides arranged at right angles to the web. The webs have spaced holes along their length. At least one rail is carried on the frame. In the exemplary embodiment two rails are provided The rails lie in a second plane spaced horizontally from the first plane. This spacing permits the panel TV to be easily lifted and attached as will be described. The channels and rails are joined together in a unitary structure by vertical elements that extend between and are secured to the rails. In the exemplary embodiment the vertical elements and rails are comprised of rectangular tube stock which provides the necessary rigidity at low cost.

The connection of the frame to the TV is made through panel mounting brackets. These brackets are not interconnected so that they can be positioned anywhere along the back of the panel to connect to the threaded holes in hard points on the back of the panel. They can desirably be formed of stock similar to the channels and include parallel sides and a right angularly related connecting web. The web has multiple spaced holes along its length. The web is placed against the panel TV and fasteners are passed through the holes to secure the brackets to the panel TV. Each bracket has secured to it at least one, and preferably two rail engagement hooks. Where two hooks are employed they are spaced the same distance apart as are the rails on the frame.

For mounting the XYZ frame on a offset arm with a mounting plate fitted, the holes on the mounting plate are aligned with holes on the channels and then secured together with fasteners. Then the panel TV, with the panel mounting brackets installed, is lifted into position. The hooks are received over the rails and the TV lowered into position. The panel TV is then free to pivot and tilt as in a Vesa-standard mounted TV.

The same XYZ frame can be employed to wall-mount a panel TV. In a wall mount the channels are secured to the wall. Normally it is necessary to locate a pair of studs to insure that connection between the wall and frame is sufficiently strong to support the frame and panel TV. Standard and non-standard stud spacing is accommodated because the channels extend across the full width of the frame and have multiple spaced holes. After the frame is securely mounted to the wall through the frame channels, the panel TV can be lifted so that the engagement hooks pass over the rails and then are lowered with the panel TV to engage and be supported from the rails. The rails are longer than all but the largest TVs and therefore, the TV may be moved horizontally on the rails to center it perfectly relative to, for example, a wall alcove. Stops prevent movement beyond the ends of the rails.

In both the wall-mount and offset arm mount of the frame, the security of the connection between the panel TV and mount structure is enhanced by a removable latch which is inserted through the vertical channel members above the hooks so that the hooks cannot be lifted off of the rails.

The invention as described has advantages for the consumer and the retailer. For the retailer stocking the kit avoids having to stock multiple disparate kits, creating a customer service burden, to help the consumer select the right kit, and restocking costs when kits are returned. For the consumer the kit satisfies the mounting requirements for virtually any TV that the consumer might initially use it with, and to TVs that the consumer may acquire in the future. The console may be assembled and used alone with a conventional CRT TV, or with a panel mount on a stand. Then later when the consumer acquires a Vesa standard LCD TV, for example, the consumer can substitute the long spine and offset arm and suspend the panel TV above the console. Should the consumer later acquire a still larger TV, or prefer wall mounting, the XYZ frame can be used. The kit incorporates multi-purpose components to reduce the parts count. All components can be broken down to lie flat for shipping and storage in the minimum space. The kit provides for a floating appearance of the panel above a console and this visual effect is enhanced by being able to hide the wires and cables within the support. Wall mounting is accomplished with minimum need to "work behind" the panel because the panel is merely lifted on the rails and supported without having to manipulate additional fasteners. The use of two engagement hooks on each bracket prevents the panel TV from swinging from the upper rail before it is secured by other means. Other advantages will appear in the following description f the drawings in which like reference numerals refer to like parts throughout and in which:

DETAILED DESCRIPTION OF THE EXEMPLARY EMBODIMENT

Figure 1:
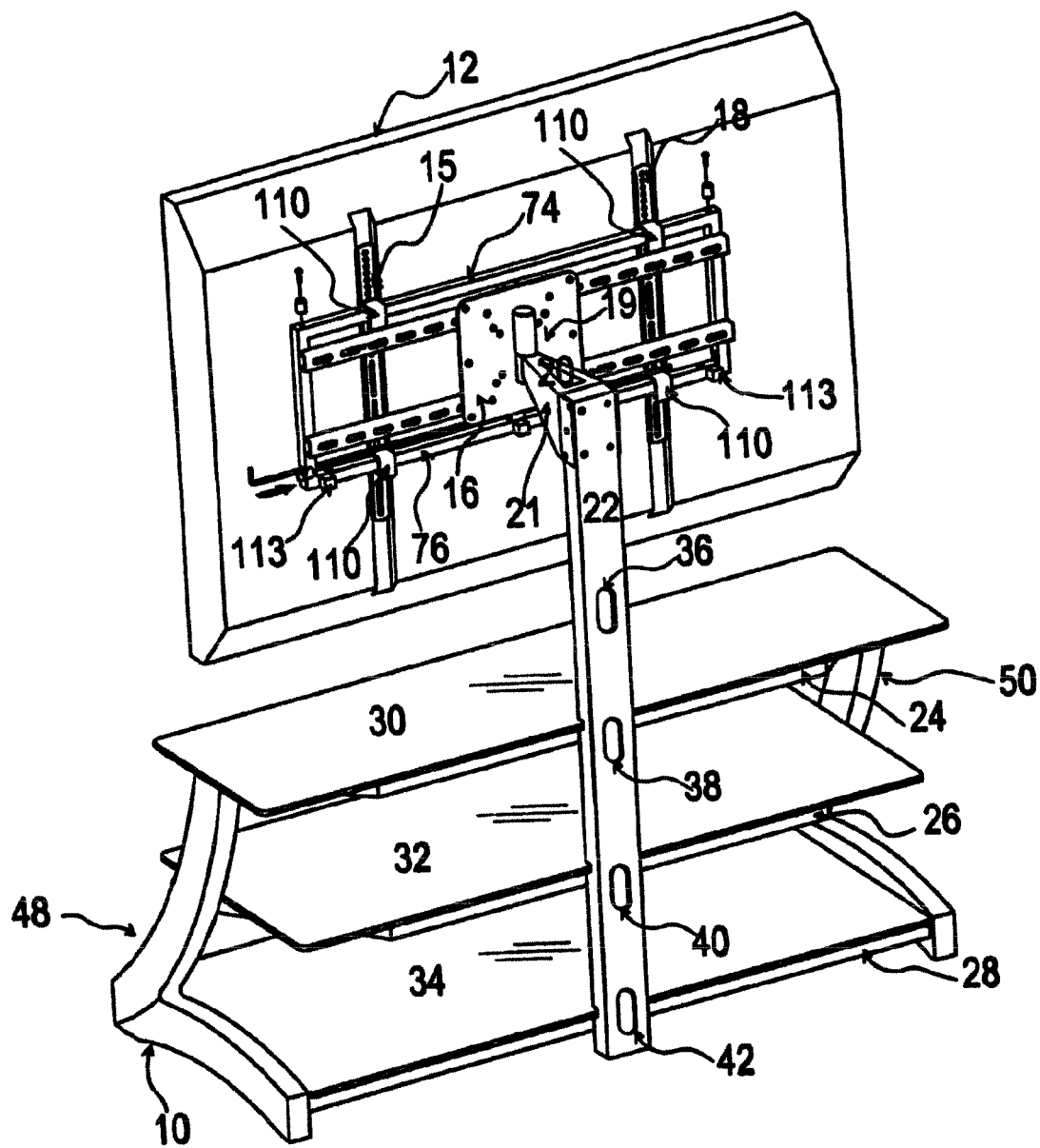
FIG. 1 is a rear perspective view of the television support and mounting kit supporting a panel TV above a console and utilizing the XYZ frame mount on the offset arm.

Referring now to FIG. 1, there is illustrated a console base 10 carrying a plasma panel TV 12 using an XYZ frame 14 connection to the panel TV through panel brackets 15 and 18. The panel brackets incorporated rail engagement hooks 110. When supporting the panel 12, the hooks 110 are received over rails 74 and 76. Limited left and right movement of the panel TV on the frame is possible until the hooks engage the stops 113. The frame is carried by the offset arm 21 through the mounting structure which comprises a mounting plate 16. The mounting plate 16 is connected by pivot bearing 19 and the offset arm 21 to the long spine 22.

Spine 22, in combination with the side panels 48 and 50, supports the TV 12 and the shelf supports 24, 26 and 28 (partially visible). The shelf supports in turn carry the shelves 30, 32 and 34. The spine contains the wire and cable openings 36, 38, 40 and 42.

Figure 2:
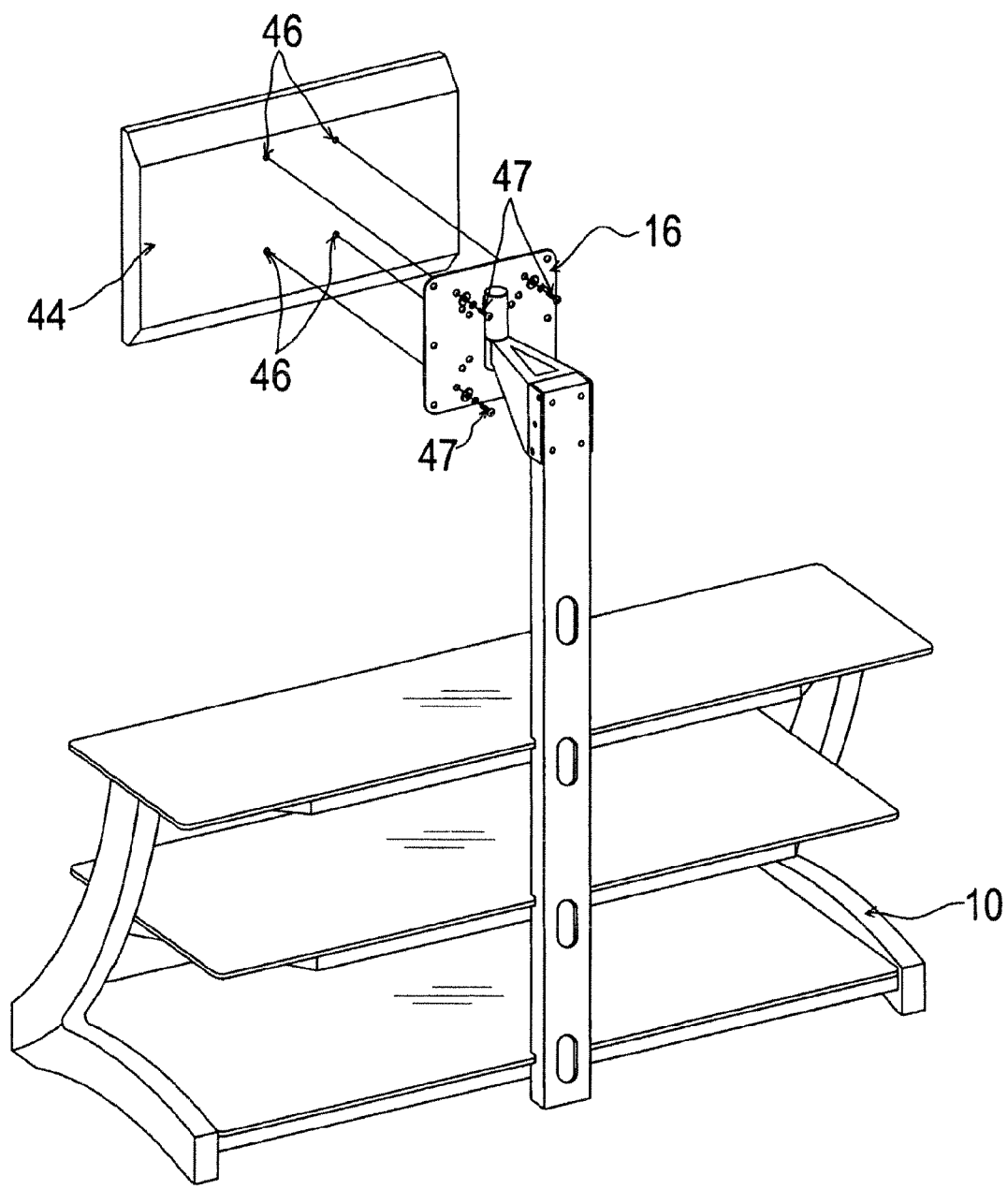
FIG. 2 is a perspective view of the television support and mounting kit supporting a TV above a console utilizing the mounting plate and offset arm.

FIG. 2 shows the same console base 10, supporting a LCD TV 44 that has 4 standard hard points with threaded bores 46. These bores match up with a set of four holes on the plate 16 so that the panel TV is supported directly from the plate 16 by inserting fasteners into the bores.

The Vesa Standard currently calls for all LCD TV's to have at least four hard points and threaded holes positioned at the corners of a rectangular shape with distances between the holes being:

75 mm×75 mm
100 mm×100 mm
200 mm×100 mm
200 mm×200 mm
400 mm×200 mm

The plate 16 has holes to accommodate LCD TV's with all of those hole patterns.

Figure 3:
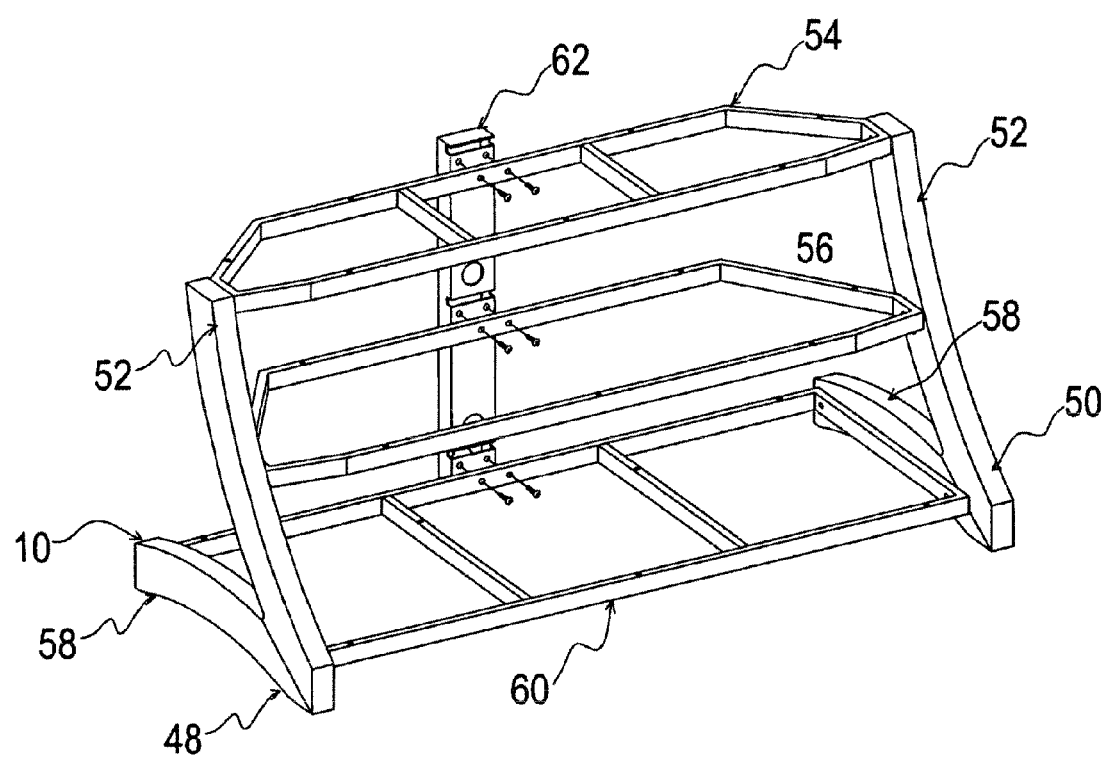
FIG. 3 shows the console structure with spine and shelf supports in place.

FIG. 3 shows the details of the structure for the console 10, which incorporates side panels 48 and 50. The upper members 52 of the side panels support the upper shelf supports 54 and 56. The lower members 58 of the side panels support the console from the floor and support the lowermost shelf support 60. The illustrated console is shown assembled with the short spine 62 which is bolted to the shelf supports 54, 56 and 60 and so cooperates with the side panels 48 and 50 to support weight carried on the upper shelves to the lower shelf support 60 and the floor on which the console rests.

Figure 4:
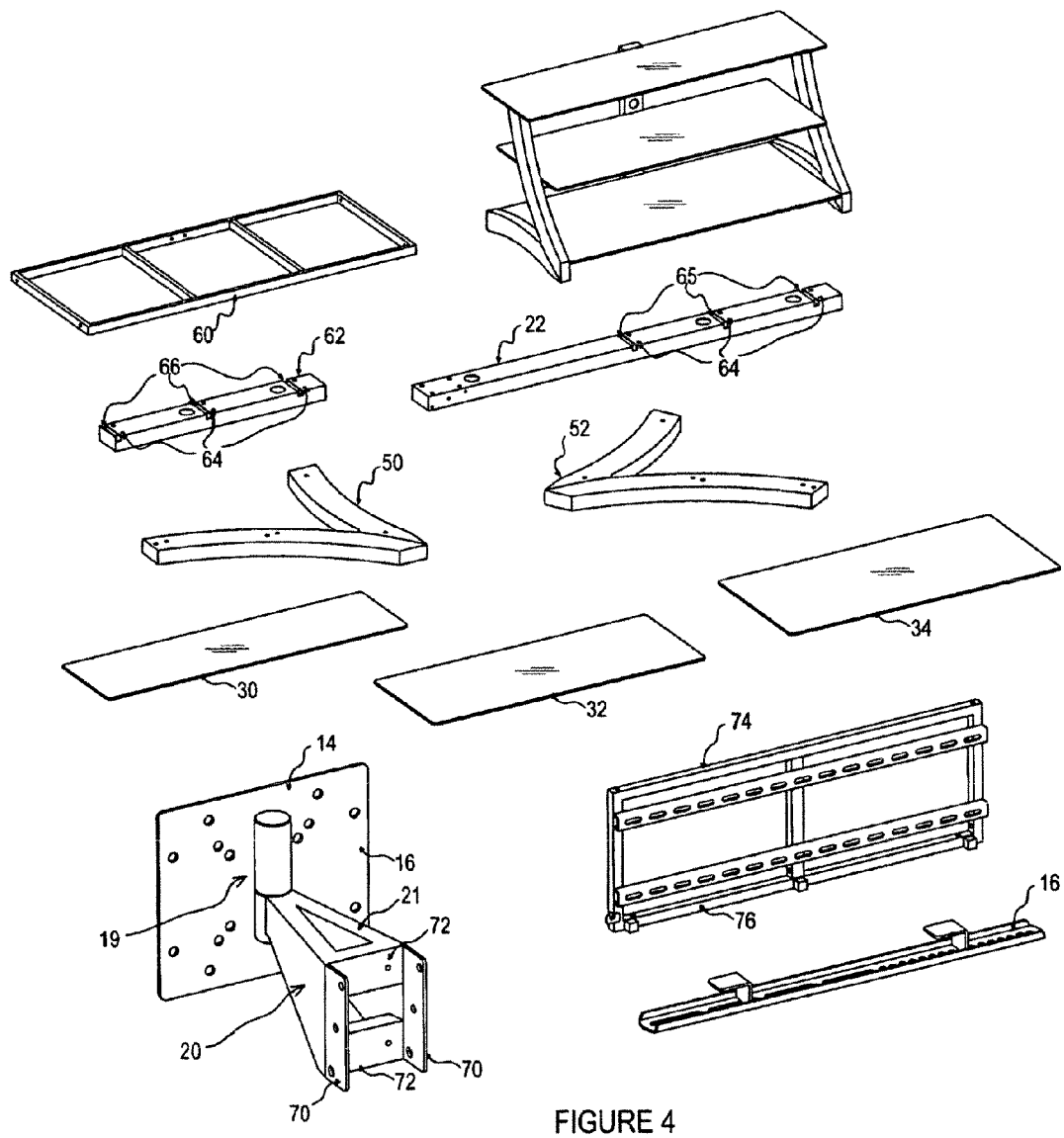
FIG. 4 is a collective figure showing the primary structural components of the console and mounts.

FIG. 4 shows the primary structural components of an exemplary form of the kit including the short spine 62 and long spine 22. As will appear the spines each have a series of spaced fastener openings 65 which permit the spines to be secured to the shelf supports and a series of spaced shelf slits 66 which accommodate that portion of the shelves that overlie the shelf supports. The side panels 50 and 52 are part of the kit as are the shelves 30, 32 and 34. A single shelf support 60 is representative of the three shelf supports in the full kit. The offset mount 20 is included. The illustrated offset mount 20 is one without the tilt mechanism but includes the mounting plate 16, the pivot bearing 19 and the offset arm 21, with vertical flanges 70 and horizontal flanges 72 for connection to the long spine 22.

A panel bracket 16 with engagement hooks 110 is representative of the two brackets that are part of the kit. The XYZ frame 14 is included for mounting larger TV's, TV's with non-standard hole patterns and for wall mounting.

The kit may alternatively or additionally include a tilting offset mount and a tilting XYZ frame to be described later.

Figure 5:
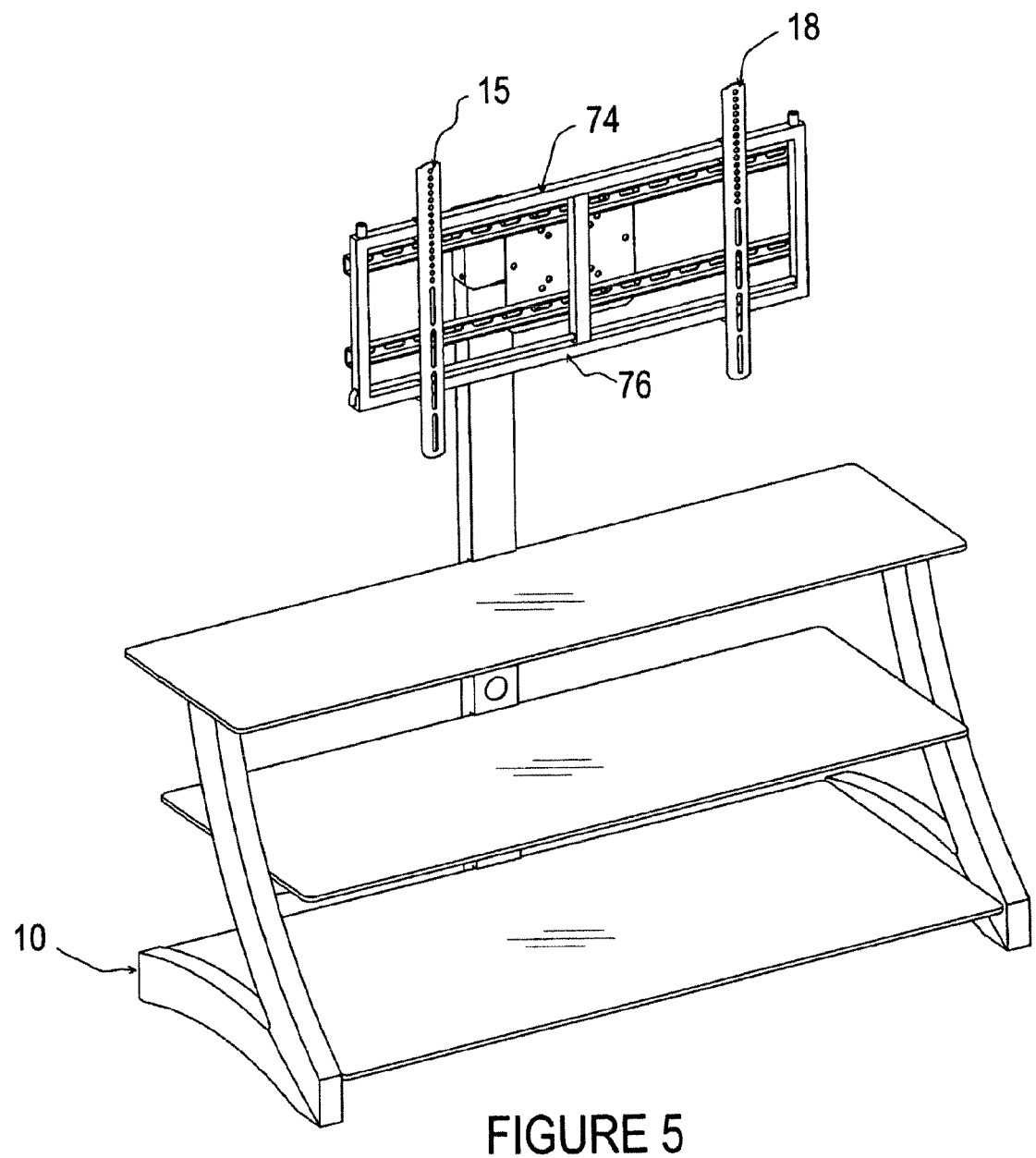
FIG. 5 is a front perspective view of the television support with an XYZ frame configured for mounting a panel TV with a non-standard hole pattern above a console.

FIG. 5 is a front view of a console and long spine 22. The installation is shown configured for use with a panel TV to be carried on an XYZ frame mount. The panel brackets 15 and 18 are shown in position over, and carried by, the rails 74 and 76. The panel TV, which would be attached to the brackets 15 and 18 is not shown for clarity.

Figure 6:
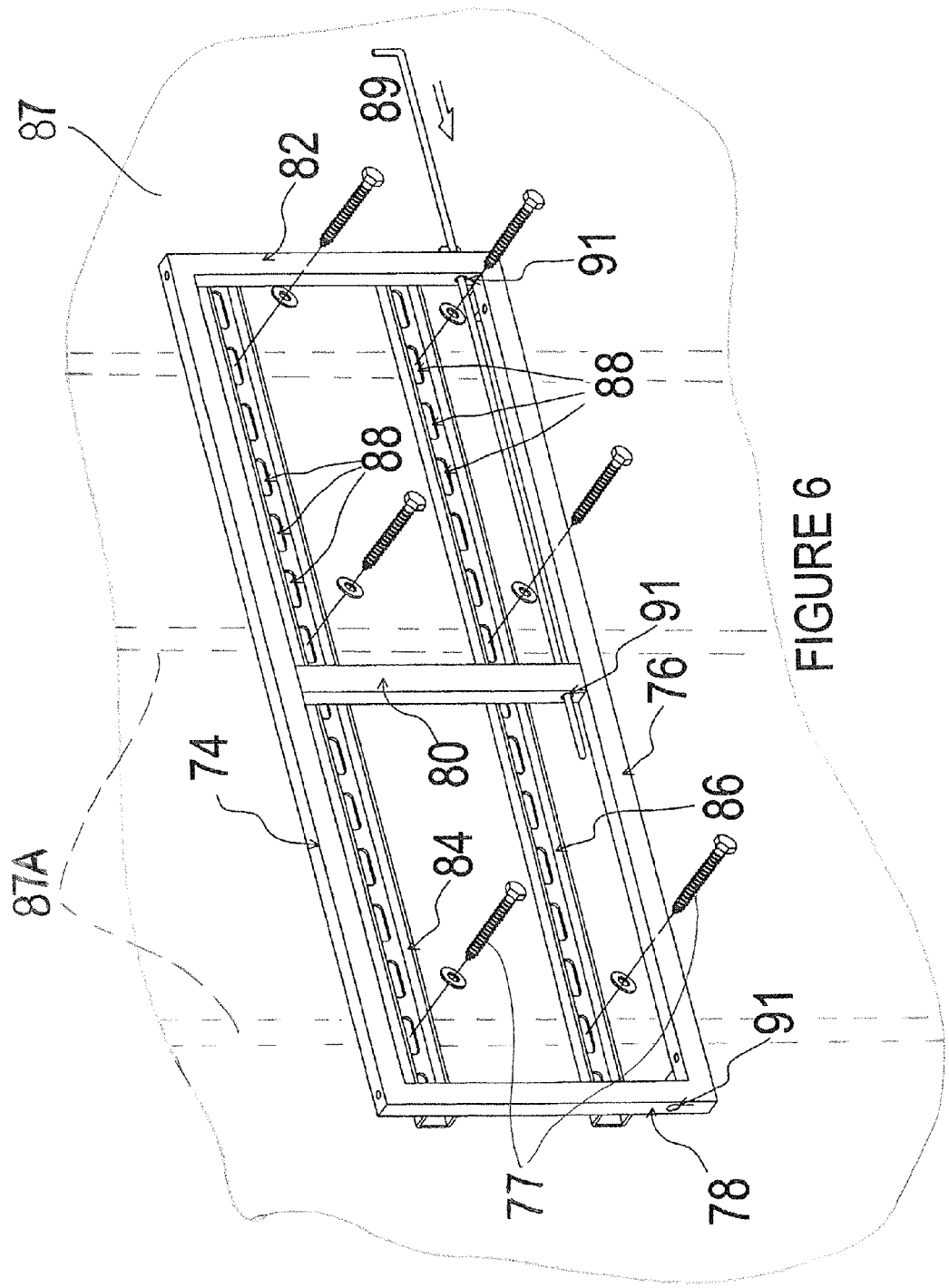
FIG. 6 is a perspective view showing the XYZ frame mount in position to be secured a wall.

FIG. 6 shows the details of the XYZ frame mount. The rails 74 and 76 are of square tubular stock and are interconnected by frame elements 78, 80 and 82 also of tubular stock. The rails and frame elements are desirably joined by welding to eliminate the need for the consumer to assemble them. A frame produced using tubular stock is as stiff as a continuous formed plate of the same size, but much less expensive to produce. Open face channels 84 and 86 bridge behind the rails and frame elements and have a series of openings of which holes 88 are representative. The open face of the channels is presented forwardly so that the consumer has access to insert and tighten lag bolts 77 that penetrate into the studs 87A or other solid structure of the wall 87. The holes 88 are elongated so that the lag bolts can be precisely aligned with the studs 87A. These same channels are used to secure the frame mount to the mounting plate 14 of the gooseneck mount (see FIG. 1). A locking bar 89 is shown partially inserted in holes 91. The bar is fully inserted after a panel TV and brackets is received over the rails 74 and 76. The locking bar prevents the panel TV from being lifted or jarred off of the rails.

Figure 7:
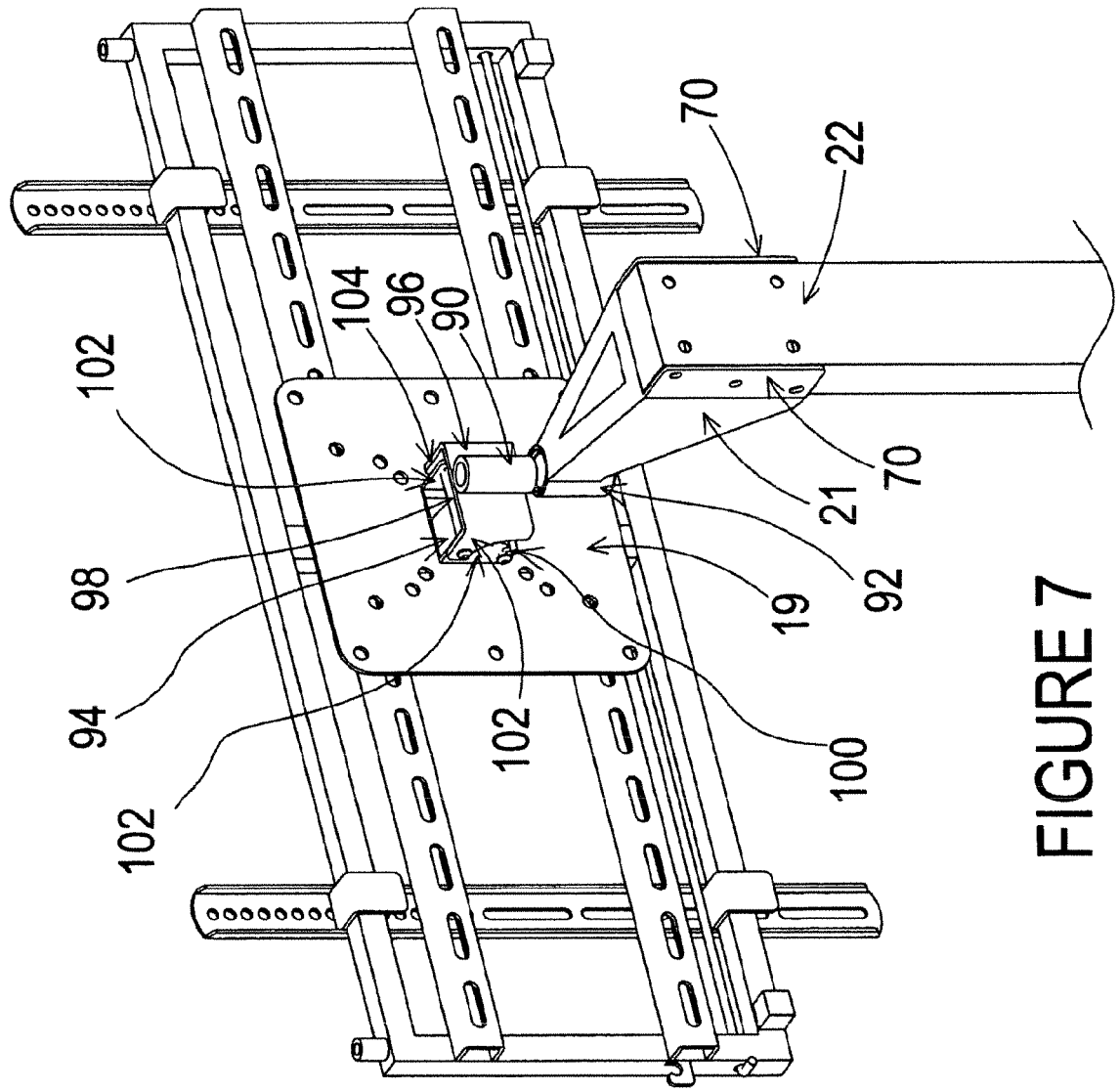
FIG. 7 is a rear perspective view of the offset arm with tilting and pivoting features in position for use on a frame mount.

FIG. 7 is a detailed view of the offset mount with the details of the tilt mount illustrated. The offset arm 21 is shown secured to the spine 22 by the flanges 70 and supports the pivot bearing 18. The pivot bearing is made of a pivot pin (not shown) fixedly attached to the holder 90. The pivot pin is received in a bearing receptacle 92. Tilt brackets 94 and 96 have overlapping flanges 102 and 104 and are hinged together at their upper ends by a pivot pin 98 received through the flanges. The amount of pivoting is selected by rotating the shaft 100 to frictionally hold the brackets in a fixed relative position as will appear in greater detail by an examination of FIG. 8.

Figure 8A:
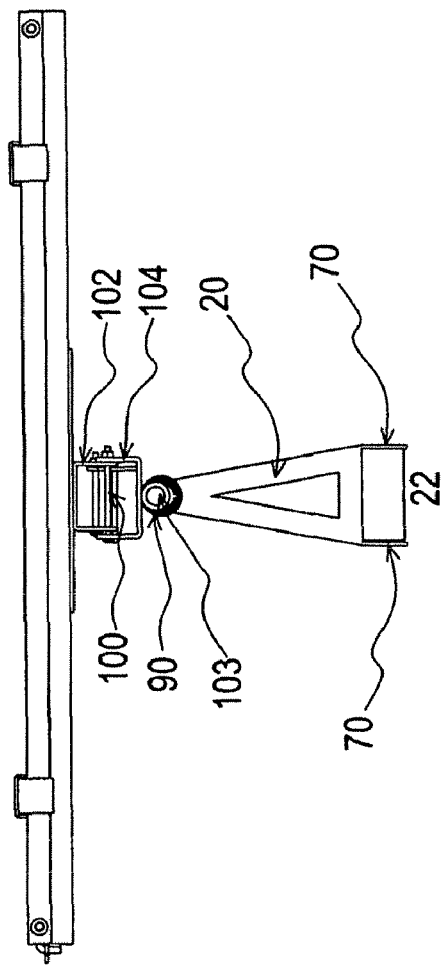
FIG. 8A is a top plan view of the pivot bearing and tilt mechanism.
Figure 8:
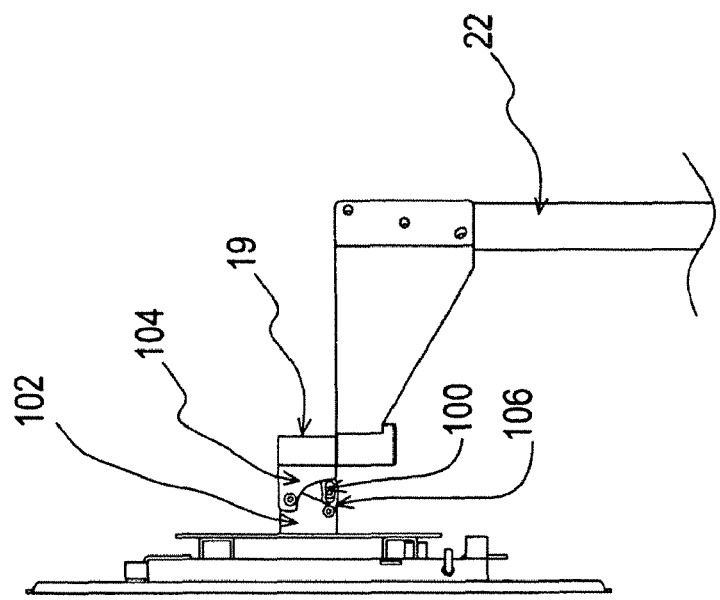
FIG. 8 is a side elevational view of the pivot bearing and tilt mechanism.

FIG. 8 shows the bracket flanges 102 and 104 which cooperate with slot 106 and shaft 100 to limit the total range of tilting to a safe amount so that if the panel TV moves the mount under the force of gravity and with insufficient friction developed by the shaft 100, then the total titling movement will be limited to an amount such that the TV won't contact the spine or the wall 87.

FIG. 8A is a top view of the offset mount 20 and shows the pin 103 in the holder 90.

Figure 9:
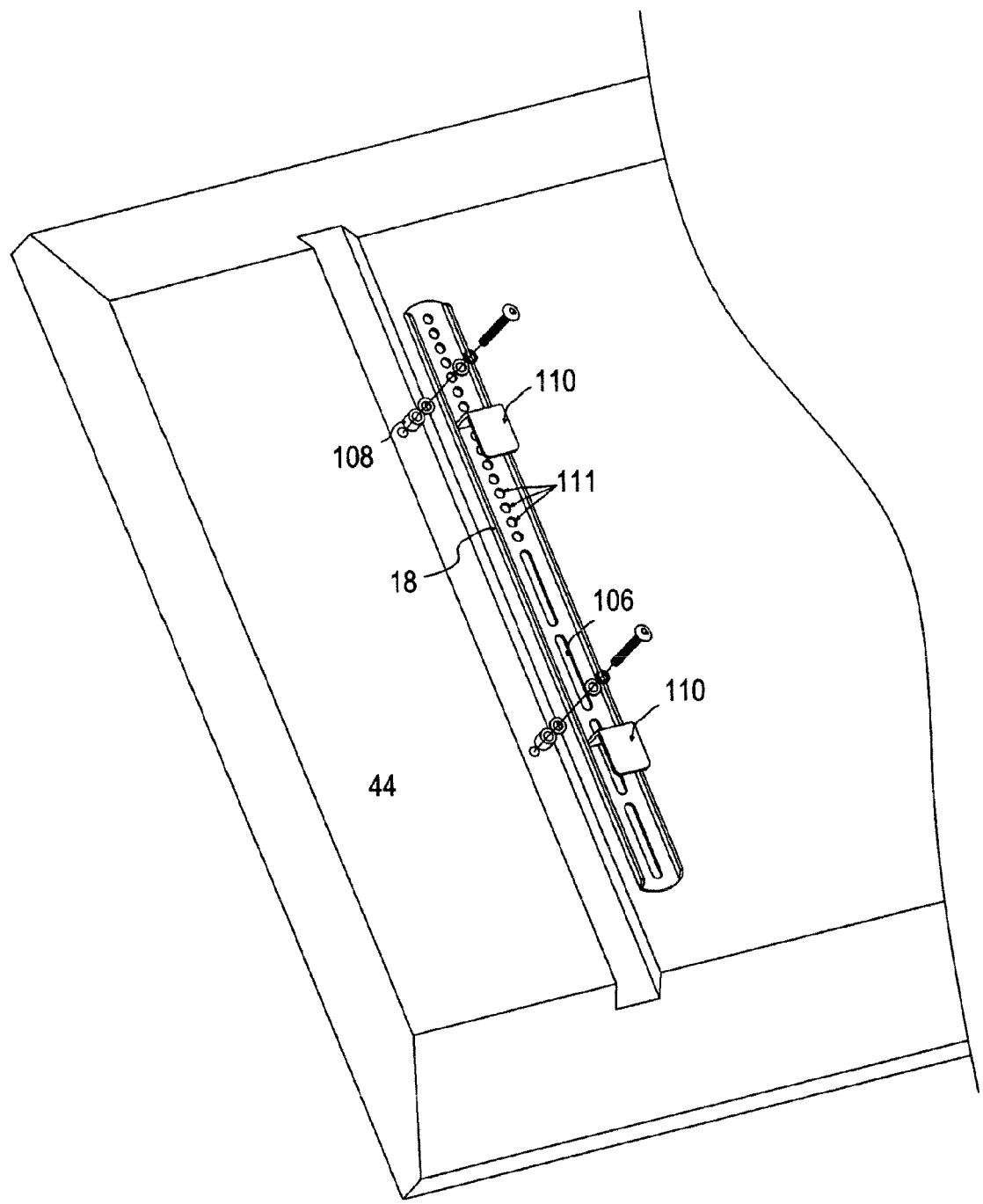
FIG. 9 is a detail view showing one of the panel brackets and the associated engagement hooks.

FIG. 9 shows an exemplary panel bracket 16. The bracket has a series of holes 111 which allow it to adapt to virtually any hole spacing on a panel TV. The mounting is accomplished through a spacer selected for proper length, such as spacer 108 to insure that the rear of the panel TV (such as a TV with a curved back) doesn't interfere with the rails and engagement hooks 110, when the panel TV is placed over the rails on the XYZ frame.

Figure 10A:
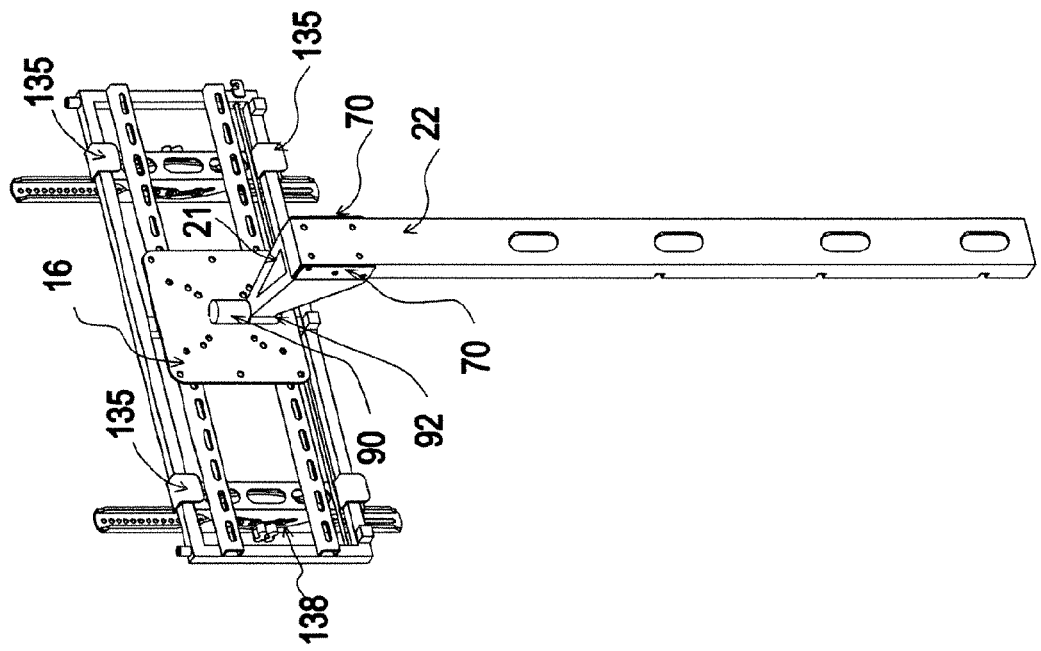
FIG. 10A is a rear perspective of the configuration of FIG. 10, showing an on-tilting pivot bearing.
Figure 10:
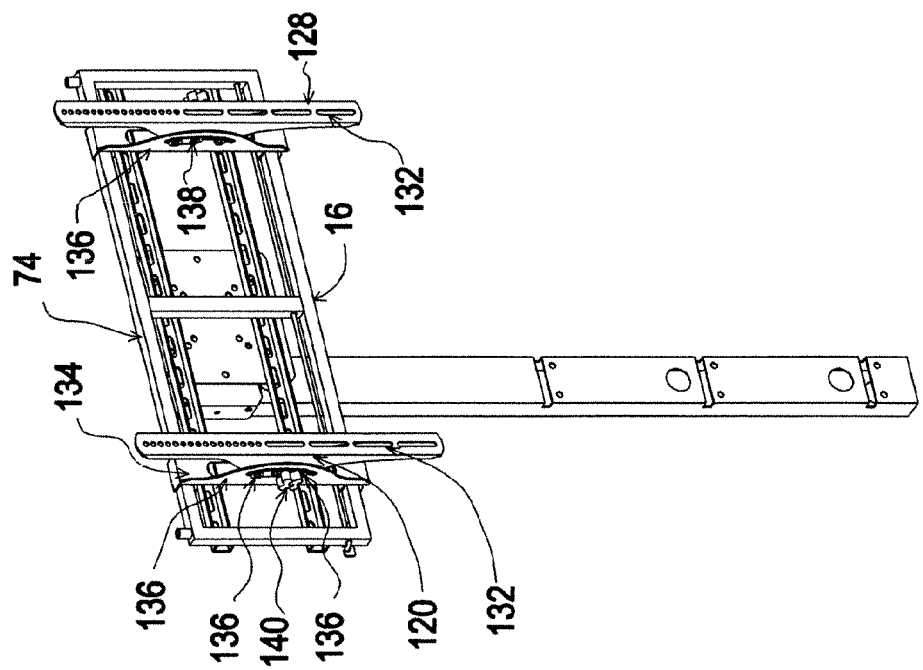
FIG. 10 is a front perspective view of an alternative configuration for the XYZ frame mount with panel brackets which accommodate a titling mechanism.

FIGS. 10 and 10A, show an alternative embodiment for the XYZ mount with a titling mechanism, which uses tilting panel brackets 132 for mounting to the rear of a panel TV. A rail hook flange 134, has hooks 135 received over the rails 74 and 76. The hook flange 134 has right angular related sides 136 with an arcuate slot 138. A handle 140 is threaded into the bracket 132. When the handle is tightened, the handle bears up against the bracket 136 and frictionally engages it so that the tilting brackets 132 are held in a desired angular relationship to the frame. As will appear the tilt brackets may be used on a long spine 22 and offset arm 21. The tilt brackets also function when the XYZ frame is mounted on a wall 87.

Figure 11:
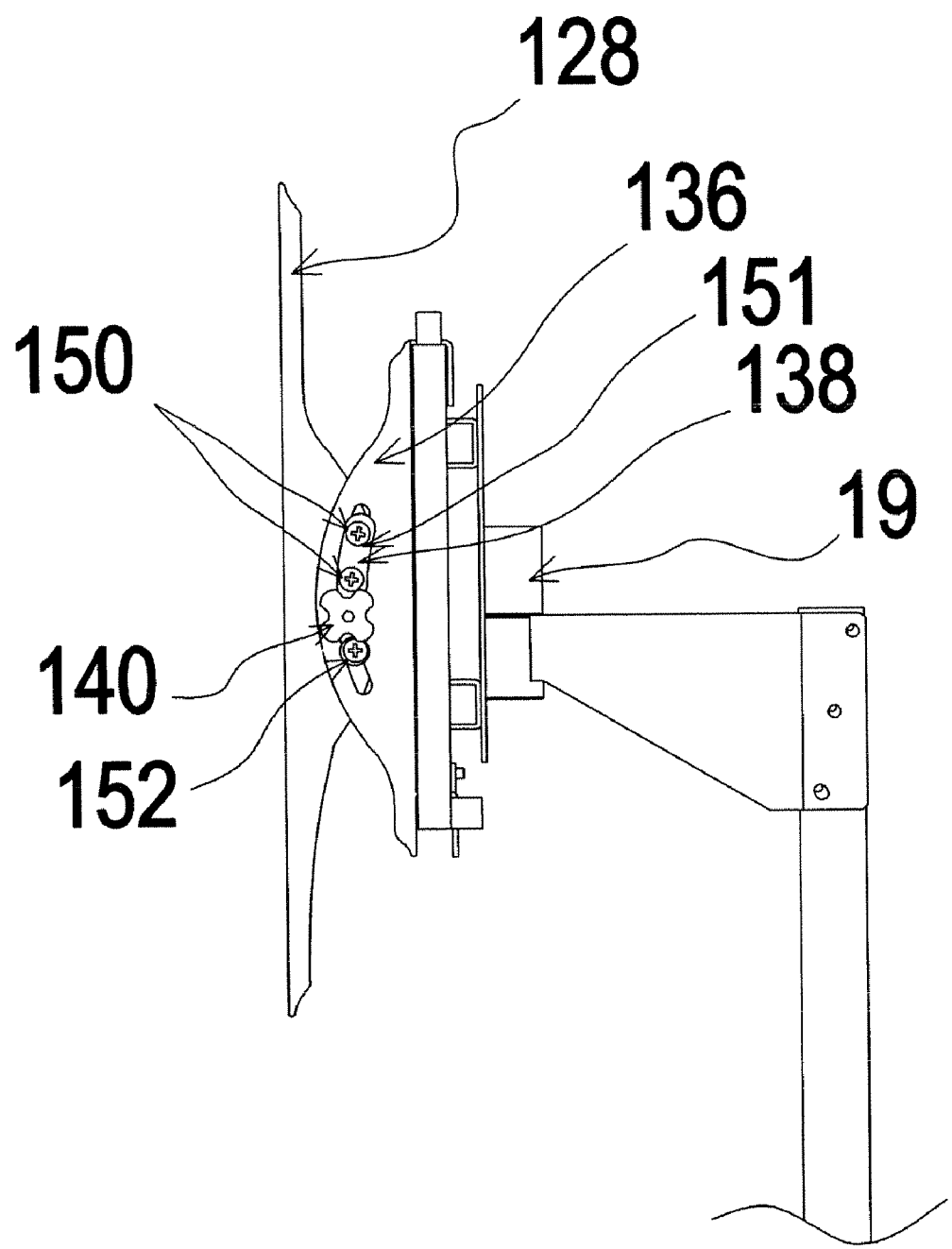
FIG. 11 is a side elevation view of the tilting mechanism for use with a frame mount

FIG. 11 shows the details of the tilting brackets of FIGS. 10 and 10A. The slot 138 accommodates bolts 150 with carry a guide 151. The bolts 150 and a third bolt 152 are received in the bracket 128. They act as stops for the tilting movement of a panel TV carried on the brackets 128 so that the range of travel does not exceed a safe amount. The selected angle is locked in by operating of the handle 140 which frictionally engages the hook flange 136 and draws the bracket 128 into frictional engagement with the hook flange.

The invention has been described in conjunction with an exemplary embodiment for clarity and enablement, however the scope of the invention should be limited only by the appended claims.

What is claimed is:

1. A flat panel television console and support kit for use in a plurality of different user assembled configurations comprising:
    a flat panel television console assembly including upper and lower horizontally extending shelf supports, and upper and lower shelves respectively carried on said upper and lower shelf supports, said flat panel television console assembly being capable of supporting a flat panel television on an upper surface of said upper shelf;
    a first short spine having a height which extends from a floor to said upper shelf support, said first short spine forming a structural component of said console assembly when said first short spine is secured to a said upper and lower shelf supports of said console assembly;
    a second long spine, having a height which extends from a floor to said upper surface of said upper shelf and further extends above said upper surface of said supper shelf terminating in an upper end which provides an elevated support for a flat panel television, said second long spine forming a structural component of said console assembly when said second long spine is secured to said console assembly;
    a cantilevered arm extending from said upper end of said second long spine;
    a flat panel television mounting assembly on a terminal end of said cantilevered arm; and
    an XYZ flat panel television mounting frame,
    said kit being useful in a first configuration wherein said first short spine is connected to said upper and lower shelf supports to transfer weight from the upper and lower shelf supports to the floor as a structural component of said console assembly, and a flat panel television is supported on said upper surface of said upper shelf of said console assembly,
    said kit being useful in a second configuration wherein a flat panel television is secured to said XYZ frame and said XYZ frame is secured to a wall above said console assembly, and further wherein said first spine is connected to said upper and lower shelf supports as a structural component of said console assembly,
    said kit being useful in a third configuration wherein a flat panel television is secured to said XYZ flat panel television mounting frame, and said XYZ flat panel television mounting frame is secured to said flat panel television mounting assembly at said upper end of said second long spine, and said second long spine is secured to said console assembly to support said flat panel television above said console assembly.

2. The kit of claim 1 wherein said first spine is hollow and has openings for receiving wires.

3. The kit of claim 2 wherein said second spine is hollow and has openings for receiving wires.

4. The kit of claim 3 wherein said TV mounting assembly includes a pivot mechanism.

5. The kit of claim 4 wherein said XYZ frame includes a tilt mechanism.

6. The kit of claim 3 wherein said XYZ frame includes a tilt mechanism.

7. The kit of claim 2 wherein said TV mounting assembly includes a pivot mechanism.

8. The kit of claim 7 wherein said XYZ frame includes a tilt mechanism.

9. The kit of claim 2 wherein said XYZ frame includes a tilt mechanism.

10. The kit of claim 1 wherein said second spine is hollow and has openings for receiving wires.

11. The kit of claim 10 wherein said TV mounting assembly includes a pivot mechanism.

12. The kit of claim 11 wherein said XYZ frame includes a tilt mechanism.

13. The kit of claim 10 wherein said XYZ frame includes a tilt mechanism.

14. The kit of claim 1 wherein said TV mounting assembly includes a pivot mechanism.

15. The kit of claim 14 wherein said XYZ frame includes a tilt mechanism.

16. The kit of claim 1 wherein said XYZ frame includes a tilt mechanism.

17. The kit of claim 1 wherein said XYZ TV mounting frame comprises:
    at least two horizontal channels lying in a first plane and including a plurality of fastener openings at spaced intervals, said channels supporting at least two elongated horizontal rails, said rails lying in a second plane, spaced forward of said first plane and parallel to said first plane, said rails being rigidly connected one to the other by at least one frame element; and
    at least two vertical panel mounting brackets having a plurality of fastener openings for receiving fasteners secured to openings in a rear surface of a panel TV, said panel brackets including rail engagement hooks at an upper end thereof, said rail engagement hooks being received over said rails to support said panel TV on said rails.

* * * * *